June 16, 1925.

E. W. MacKAY-WHITE 1,542,069

DIFFERENTIAL GEAR

Filed Sept. 11, 1922

Inventor
E.W. MacKay-White
By E.J. Fetherstonhaugh
Atty.

Patented June 16, 1925.

1,542,069

UNITED STATES PATENT OFFICE.

ERIC WILLIAM MacKAY-WHITE, OF EDMONTON, ALBERTA, CANADA.

DIFFERENTIAL GEAR.

Application filed September 11, 1922. Serial No. 587,597.

*To all whom it may concern:*

Be it known that I, ERIC WILLIAM MAC-KAY-WHITE, a subject of the King of Great Britain, and residing at the city of Edmonton, in the Province of Alberta, in the Dominion of Canada, have invented a new and useful Improvement in Differential Gears, of which the following is the specification.

My invention particularly relates to differential gears for vehicles of the chain tracks or self laying track type.

With this type of vehicle when it is desired to deviate from a straight course, the track which is on the outer side of the curve must be caused to travel at a greater speed than the track which is on the inner side of the curve. Heretofore this has been accomplished by means of brakes or of clutches, neither of which methods provides a sufficiently accurate means of steering a vehicle travelling at speed in traffic.

The object of my invention is to provide a means of accelerating and of retarding the outer and the inner tracks respectively without the aid of clutches, brakes and such like mechanisms.

I attain these objects by means of the mechanism as illustrated in the accompanying drawings, in which:—

Similar letters refer to similar parts throughout the various views.

Figure 2:
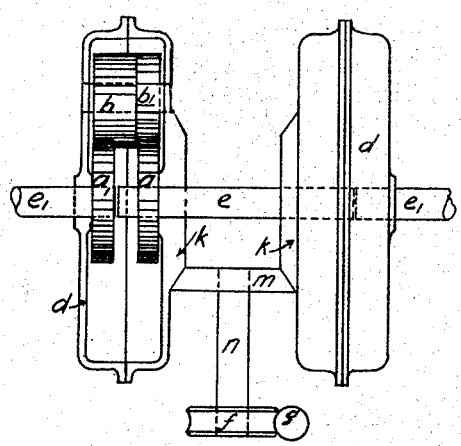
Fig. 2 represents a plan view of Fig. 3, part of the rotary member and four of the planet pinions having been removed from the left half.
Figure 1:
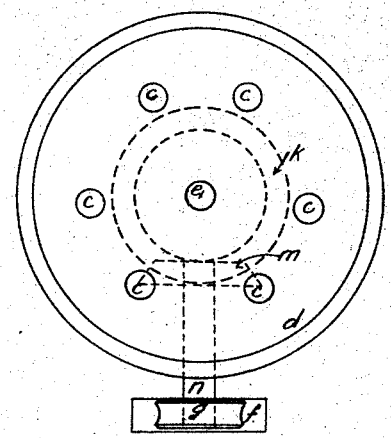
Fig. 1 represents an elevational view of an alternative arrangement of my differential gear.

Each of the two differential gears consists of a driving shaft $e$ with a driving gear wheel $a$ mounted upon it and a driven gear wheel $a^1$ mounted upon a driven shaft $e^1$, and planet pinions $b$—$b^1$ meshing with gear wheels $a$—$a^1$ and revolving on shafts or axles $c$ carried by rotary members $d$, the rotary members $d$ being capable of rotation concentrically about the shafts $e$—$e^1$.

The rotary members are controlled by a worm $g$ and a worm wheel $f$, the worm $g$ preferably through the gear $m$ on the worm wheel shaft $n$ and the gears $k$ and $k$ attached to the rotary members $d$, the worm wheel $f$ being so constructed that the worm wheel $f$ cannot drive the worm $g$, due consideration being paid to friction. The track pinions (not shewn) are connected to the shaft $e^1$.

The object of my invention is attained as follows:—

The driving shaft $e$ rotates the gears $a$, which coact with the pinions $b$ mounted on a plurality of shafts in the rotating members $d$. The pinions $b^1$ are coincidently rotated with the pinion $b$ and travel on the gears $a$ or clutch the same as the case may be.

The rotating members $d$ are free on all shafts, consequently all control is through the worm and gear and bevel gears fixedly secured to said rotating members, as for instance, the shaft $e$ being driven turns the central gears $a$ and the gears $a^1$ on the shafts $e^1$ are in train, therefore as the pinions $b$ are rotated in an opposite direction to the gear $a$ and the pinions $b^1$ turning the same way as pinions $b$ turn the gear $a^1$ in an opposite direction, which is the same way as the shaft $e$.

This operation occurs if the members $d$ are held from rotation by the worm and gear and in fact the operation continues up to the time that the worm and worm wheel reach the same speed as the shaft $e$ or greater.

During the period of change from stop to even speed of the worm and wheel the speed of the shafts $e^1$ will be constantly changing for the very good reason that when the rotating members hold fast the train of gears is in full operation and is merely transmission of power from the shaft $e$ to the shafts $e^1$, whereas if the members $d$ are permitted to rotate slowly, the power is reduced to the margin of rotatory motion between the shaft $e$ and members $d$ after deducting the low speed of the members $d$ from the high speed of the shaft $e$ and as this is a worm and wheel control it will lock itself at any chosen speed and the planetary movement will be immediately affected thereby.

I am aware that differential gears are already in use for the purpose of enabling the driving wheels of vehicles to adjust their speed on curves and I, therefore, do not claim such gears broadly, but what I do claim as my invention is:—

In differential gears of the planetary type, a pair of rotating members in the form of gear casings, driving and driven shafts forming bearings for said members and operatively connected therewith, driving gears mounted on said driving shafts, driven gears mounted on said driven shafts, communicating gears multiplied in numbers and journalled on bearings in said casings and connecting said driving and driven gears, outer gears secured to said casings, a cooperating gear and a worm wheel shaft bringing the latter gear into coaction with said casing outer gears, and a worm coacting with a worm wheel on said worm wheel shaft in effecting the locking or partial locking of the planetary system.

Signed at the city of Edmonton, this first day of August, 1922.

ERIC WILLIAM MacKAY-WHITE. [L. S.]

In the presence of:
GLADYS CUFF,
JAS. ALLENDICE.